April 14, 1931.  C. G. HAWLEY  1,801,044
CENTRIFUGAL STEAM PURIFIER
Filed July 24, 1926

Inventor
Charles G. Hawley
By
C. A. Mason
Attorney

Patented Apr. 14, 1931

1,801,044

UNITED STATES PATENT OFFICE

CHARLES GILBERT HAWLEY, OF CHICAGO, ILLINOIS, ASSIGNOR TO CENTRIFIX CORPORATION, OF CLEVELAND, OHIO, A CORPORATION OF OHIO

CENTRIFUGAL STEAM PURIFIER

Application filed July 24, 1926. Serial No. 124,682.

This invention relates to improvements in means for abstracting moisture and contained solids from steam which is on the point of leaving a steam boiler. The invention comprises the hereinafter described modifications of and improvements upon centrifugal steam separators of the centrifugal types disclosed in my earlier applications and patents and will be readily understood on reference to the drawings which form part of this application.

Figure 1:
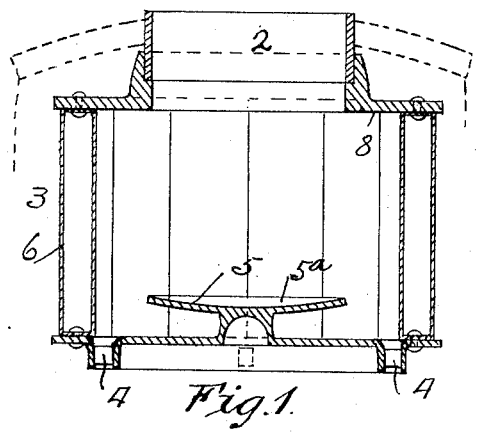
Figure 4:
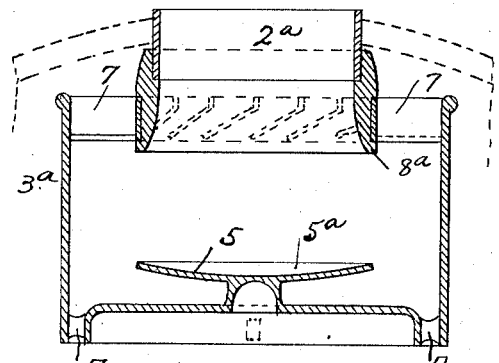
Figure 2:
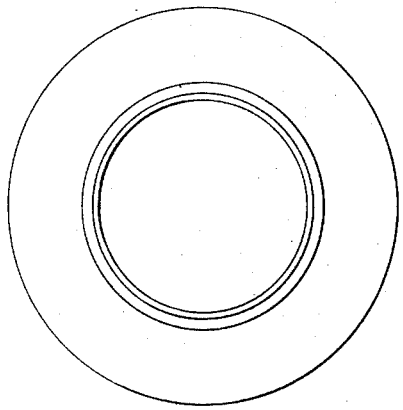
Figure 5:
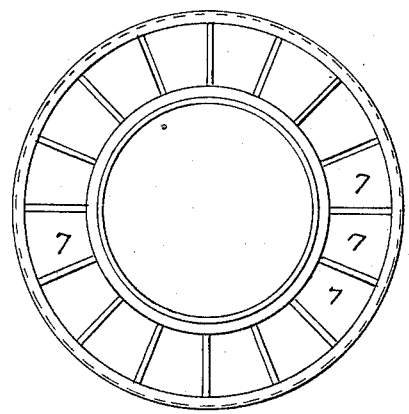
Figure 3:
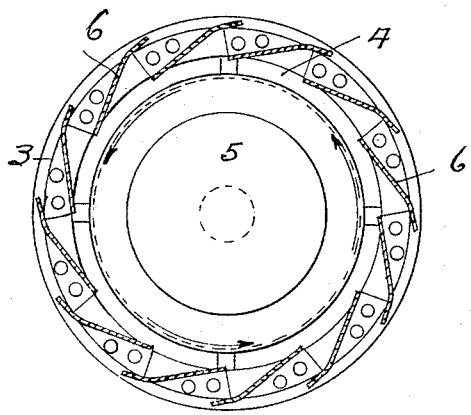
Figure 6:
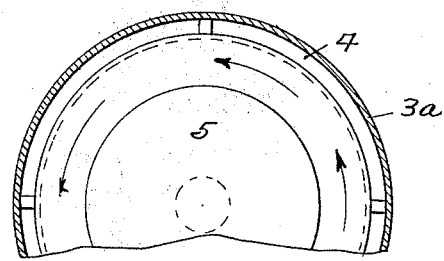

In said drawings, Fig. 1 is a vertical section of a multiply tuyered centrifugal steam separator or purifier embodying the invention; Fig. 2 is a plan view thereof; Fig. 3 is a horizontal section of the same disclosing the forms of its tangential or whirl promoting tuyère blades; Fig. 4 is a vertical section of a modified form of my invention; Fig. 5 is a plan view thereof disclosing the circumferential series of tangential or whirl promoting tuyère blades; and Fig. 6 is a horizontal section taken from Fig. 4.

The purifier which is typical of my invention has a central outlet and a body portion depending therefrom and formed to admit the steam, being substantially the only avenue through which the steam from the steam space in the boiler may enter the outlet. Said body is contrived with tangentially disposed whirl promoting blade portions which give the steam a vortexial or whirling action within the body and beneath said outlet. The moisture carried by the steam and the contained solids, if any, are centrifugally separated within the body and are discharged at the bottom thereof. Unfortunately, however, the vortex tends to draw a portion of the moisture to the axis of the body and outlet and to cause the discharge thereof at the outlet along with the steam. As a means of defeating this objectionable action of the vortex or whirling body I employ a so-called vortex breaking disk of about the diameter of the outlet coaxial therewith and positioned a short distance above the bottom of the body or fixture, thereby a liquid retention cavity is provided beneath the plate and two main purposes are accomplished. First, the moisture delivered upon the bottom is prevented from reaching the axis of the vortex, and, second, when need be an excessive accumulation of moisture may be momentarily retained upon the bottom until safely discharged therefrom. Such is the nature and purpose of the present invention.

The invention may be expressed or embodied in numerous forms. Only two thereof are shown herein, and they differ only in the form of the tuyères and tuyère blades chosen therefor.

The above-mentioned central outlet is marked 2 in Fig. 1 and 2a in Fig. 4. The tangentially tuyered body is similarly marked 3 in Fig. 1 and 3a in Fig. 4. The moisture discharge openings are identical and are marked 4 in both cases. Likewise, the beforementioned vortex breaking disks are substantially identical and may actually be identical, and are marked 5 in both Figs. 1 and 4. The structural difference is therefore seen to reside in the longitudinally disposed tangential tuyère blade 6 of Figs. 2 and 3, as contrasted with the transversely disposed tangential tuyère blades 7 of Figs. 4 and 5. The characteristic of the structure of Fig. 1 is the annular abutment 8 below the outlet 2, which serves to prevent the direct passage of moisture from the adjacent tuyère ends to the outlet, the moisture being forced downward and expelled through the peripheral opening or openings 4 at the bottom of the fixture. The counterpart in Fig. 4 is found in the annular abutment 8a that serves the same purpose.

By preference the vortex breaking plate or disk 5 presents a concave surface 5a on the top. By concaving the plate the rapidly whirling vortex or body of steam within the fixture or separator is caused to create a void above and at the periphery of the plate 5 and any moisture that may be delivered to the top of the plate almost instantly takes its place in said void. So positioned it is within the zone or region of a centrifugal force adequate for the expulsion of the moisture upon the plate and thus it is projected against the inner periphery of the fixture where it properly belongs and from whence it may be ejected through the opening 4.

Having thus described my invention, I claim as new and desire to secure by Letters Patent:

1. The herein described separator or purifier comprising in combination a top member containing a central outlet opening of relatively large diameter, a multiple tuyèred and substantially cylindrical body portion of little greater diameter than said outlet and depending from said top member, a bottom member co-axial with said outlet and spaced therefrom by said body portion, a similarly co-axial concave vortex defeating member, raised upon said bottom member and presenting its concavity toward said outlet, and suitable eject means for the disposal of the separated substances, substantially as and for the purposes specified.

2. The herein described separator or purifier comprising in combination, a top member containing a central, upwardly leading outlet, a multiple tuyèred body portion, a bottom having at its periphery a liquid discharge opening and a vortex breaking plate positioned rigidly upon said bottom centrally above said bottom.

3. The herein described separator or purifier comprising in combination, a top member containing a central, upwardly leading outlet, a multiple tuyèred body portion depending from said top member, a third member forming a bottom for said body and having at its periphery a liquid discharge opening, and a concave vortex breaking plate presenting its concavity toward said outlet and positioned rigidly upon and centrally above said bottom.

In testimony whereof I have hereunto set my hand this 23rd day of July, A. D. 1926.

CHARLES GILBERT HAWLEY.